United States Patent

Larsen

[15] 3,691,109

[45] Sept. 12, 1972

[54] PROCESS FOR REGENERATING RESINS OF DEIONIZATION SYSTEM

[72] Inventor: Arthur L. Larsen, Denver, Colo. 80210

[73] Marathon Oil Company, Findlay, Ohio

[22] Filed: May 25, 1970

[21] Appl. No.: 40,183

[52] U.S. Cl. ............... 260/2.1 R, 210/32, 260/2.2 R
[51] Int. Cl. .......................... B01d 15/06, C02b 1/76
[58] Field of Search .................. 210/32; 260/2.1, 2.2

[56] References Cited

UNITED STATES PATENTS

| | | | |
|---|---|---|---|
| 2,999,821 | 9/1961 | Fisher | 260/2.1 |
| 3,111,485 | 11/1963 | Kunin | 210/32 |
| 3,156,644 | 11/1964 | Kunin | 210/32 |
| 3,388,059 | 6/1968 | Wirth | 210/32 |
| 3,429,835 | 2/1969 | Odland | 260/2.1 |
| 3,438,891 | 4/1969 | Schmidt et al. | 210/32 |
| 3,458,440 | 7/1969 | Schmidt | 210/32 |
| 960,887 | 6/1910 | Gans | 210/38 |

*Primary Examiner*—Melvin Goldstein
*Attorney*—Joseph C. Herring, Richard C. Wilson, Jr. and Jack L. Hummel

[57] ABSTRACT

A weak acid resin which is exhausted by contact with bases is regenerated by contact with carbonic acid formed by introducing carbon dioxide into water under a pressure of from 100 to 300 psi. The carbonic acid is capable of regenerating the sodium form of the weak acid resin. The sodium bicarbonate from the regeneration of the weak acid resin is then degassed to eliminate the carbonic acid or $CO_2$ and the remaining sodium bicarbonate is used to regenerate a weak base anion resin. The ion exchange beds are then run in reverse, that is, the anions are exchanged before the cations.

4 Claims, 1 Drawing Figure

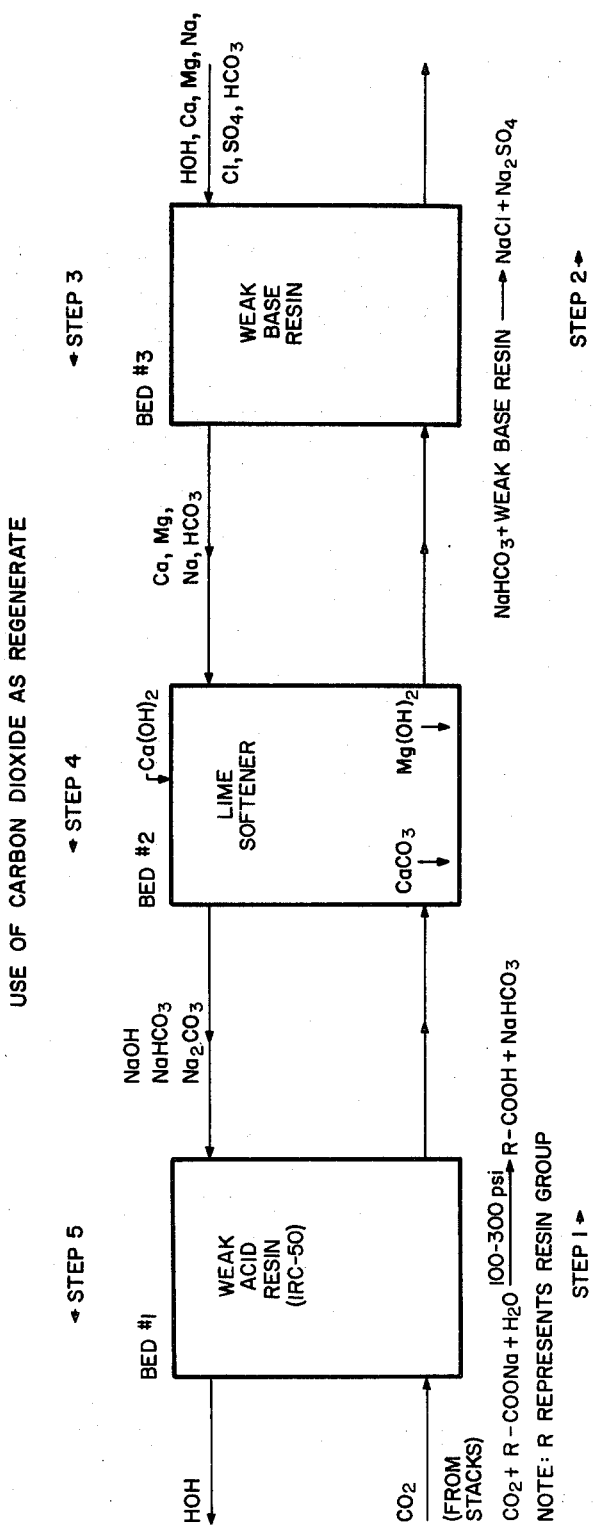

PROCESS FOR REGENERATING RESINS OF DEIONIZATION SYSTEM

BACKGROUND OF THE INVENTION

1. Field of the Invention

This invention is directed to a process of regenerating weak acid cation exchange resins and weak base anion exchange resins. The process is especially concerned with using carbon dioxide to regenerate the sodium form of an exhausted weak acid cation resin to its free acid form and then using the sodium bicarbonate to regenerate weak base anion resins. By product carbon dioxide from industrial sources such as petroleum refinery stacks and heaters may be employed in this process.

2. Description of the Prior Art

Deionization processes employing weak acid and weak base resins such as those found in U.S. Pat. No. 3,111,485 are well known to the chemical art. Although weak acid and weak base resins do not effect as complete deionization as strong acid and strong base resins, there are many applications where complete deionization is not required. Furthermore, one very real advantage to using weak acid cation exchangers or weak base anion exchangers is the achievement of very high regeneration efficiencies. Both types of weak exchangers can be effectively regenerated to high levels by employing amounts of regenerates only slightly in excess of the stoichiometric amounts theoretically required. An example of a weak acid resin would be Rohm & Haas' Amberlite IRC-50, a carboxylic resin based upon a methacrylic acid crosslinked copolymer. Weak base anion exchangers are also well known in the art. Typically, these resins are polyamine resins such as Rohm & Haas Amberlite IR-45.

SUMMARY OF THE INVENTION

A weak acid resin such as Rohm & Haas Amberlite IRC-50 is regenerated with carbon dioxide in water, i.e., carbonic acid. Carbonic acid is capable of regenerating the sodium form of IRC-50; however, it is not capable of removing either calcium or magnesium ions. These ions must be removed at a later stage in the process. With respect to the sodium, however, the bicarbonate of sodium from the regenerated IRC-50 is degassed to eliminate the carbonic acid or $CO_2$ whereupon the sodium bicarbonate is used to regenerate a weak base anion resin, such as Rohm & Haas Amberlite IR-45. The effluent from this regeneration is primarily sodium chloride and sodium sulfate.

The ion exchange resins are then run in reverse, that is, the anions exchanged before the cations. The influent to the weak base resin contains sodium, calcium, magnesium, sulfate, chloride and bicarbonate ions. The effluent contains sodium, calcium, magnesium and some bicarbonate ions. This effluent then goes to either a cold or hot lime softening process where the addition of lime precipitates the calcium as calcium carbonate and the magnesium as magnesium hydroxide. The effluent from this process contains sodium hydroxide, sodium carbonate, and bicarbonate. This effluent can then go to the hydrogen regenerated weak acid cation exchange resin where the sodium is exchanged for hydrogen. This produces $H_2O$ and possibly $H_2CO_3$. There might also be a small amount of calcium and magnesium present, due to leakage. Therefore, the weak cation base present may have to be occasionally treated with sulfuric or hydrochloric acid. If the bicarbonate is sufficiently high in the effluent from lime softener, it may be necessary to have a primary and secondary ion exchange resin for the removal of the sodium. The overall result of this weak acid/weak base exchange would be reduced resin regeneration costs and lower carbon dioxide pollution near industrial sites. Carbon dioxide by-products of refinery operations are particularly suited for the regeneration of such ion exchange resins.

DESCRIPTION OF THE DRAWING

A three bed deionization apparatus is depicted in the accompanying schematic diagram. The beds are labeled 1, 2, and 3. Carbon dioxide in water under 100–300 psi is passed, as indicated at step 1, to a weak acid resin such as IRC-50 to regenerate the sodium form of the resin. The sodium bicarbonate from the regeneration of the resin is degassed to eliminate the carbon dioxide and then the sodium bicarbonate is used to regenerate a weak base anion resin as indicated at step 2. As indicated in the drawing, the effluent from this regeneration is primarily sodium chloride and sodium sulfonate. The ion exchange beds 1, 2, and 3 would then be run in reverse, that is, the anions would be exchanged before the cations. The influent to the weak base resin in bed 3 in step 3 contains sodium, calcium, magnesium, sulfate, chlorides and bicarbonate ions. After step 3, the weak base resin is exhausted, the effluent from bed 3 contains sodium, calcium, magnesium, and bicarbonate ions. This effluent goes to either a cold or hot lime softening process in bed 2. The addition of lime depicted as step 4 in the process precipitates calcium as calcium carbonate and magnesium as magnesium hydroxide. The effluent from step 4 contains sodium hydroxide, and small amounts of sodium carbonate and bicarbonate. This NaOH, $NaHCO_3$ and $Na_2CO_3$ effluent then passes to step 5 in bed 1 wherein the sodium ions are exchanged for the hydrogen ions of the hydrogen regenerated weak acid cation exchange resin. This completes the resin thereby exhausting this resin regeneration cycle.

DESCRIPTION OF PREFERRED EMBODIMENTS OF INVENTION

Starting Material

Preferably, the exchange system is a three bed unit in series. The first bed consists of a carboxylic-type resin such as Amberlite IRC-50. The preferred cationic exchange unit used in this invention includes those disclosed in U.S. Pat. Nos. 2,319,359; 2,333,754; 2,340,110; and 2,340,111. A particularly preferred cation exchanger is one having carboxylic acid groups in the molecule, prepared by suspension copolymerization of a mixture of methacrylic acid and about 3 to 10 percent divinyl benzene. This type of resin is commercially available as Amberlite IRC-50 from the Rohm & Haas Co., Philadelphia, Pennsylvania. Numerous other well-known types of carboxylic cation ion exchangers such as hydrolyzed styrene maleic anhydride copolymer cross-linked with divinyl benzene, with acylic acid formaldehyde and others of this general nature may be used. Examples of weak base anionic exchange resins which may be used in this invention are those disclosed in U.S. Pat. Nos. 2,354,671; 2,356,156; 2,402,384; and 2,675,359. Other weak base resins prepared by the reaction of phenols with formaldehydes and a polyalklene amine may be employed. Weak base resins prepared as described in U.S. Pat. No. 2,591,574 by a reaction of a aryl methylated crosslinked copolymer with a primary or secondary amine are also included in the scope of this invention. A specific example of such a weak base resin is Rohm & Haas Amberlite IR-45.

One equivalent of acid or base will remove the ions or regenerate one equivalent of depleted cation exchanger or anion exchanger respectively. In practice, it is preferred to use 1.1 equivalents of regenerates per equivalent of depleted exchanger. The volume of $CO_2$ saturated water at the temperature conditions of the reaction per equivalent of depleted cation exchanger is of course dependent upon the pressure over the carbon dioxide solution.

Pressure

In the process of the present invention, the aqueous solution of carbon dioxide can be employed at pressures from about 50 to 1,000 psi. The more preferred range is about 75 to 500 psi. and the most preferred range is about 100 to 300 psi. Much of the equipment presently employed for deionization processes is designed to withstand pressures in the preferred range. It is to be noted that although the pH of a carbonic acid solution at room temperature and atmospheric pressure is 4.0, water saturated with carbon dioxide at carbon dioxide pressures in the range of 75 to 150 psi is about 3.3. In this pH range, carboxylic cation exchangers have negligible capacity for monovalent and divalent ions and thus can be readily requested by such a pressurized solution of carbon dioxide.

Reaction Media

The fluids which can be deionized by the process of the present invention are widely divergent in nature, but they must contain sufficient water or some ionizing liquid to effect ionization of the ionizable salts therein. Typical of such fluids are raw water supplies which are used for boiler feed, for chemical processing or for the preparation of a variety of aqueous solutions, aqueous glycerol, sugar solutions, etc. As set forth herein, the deionization of fluids employing weakly acidic cation exchangers and weakly basic anion exchangers are well known in the art. The modification of the process taught in the present invention consists of using carbon dioxide in water to regenerate the sodium form of the weakly acidic cation exchanger, and then using the sodium bicarbonate from the regeneration of weak acid resin to regenerate a weak base anion resin. The system is then run in reverse to eliminate magnesium ions, calcium ions, and exchange the sodium ions for the hydrogen ions of the hydrogen regenerated cation exchange resin.

It should be noted that the concentration of the carbon dioxide in the aqueous solution employed for the regeneration of the cation exchanger is in proportion to the carbon dioxide pressure applied to the solution. Thus, while it is possible to regenerate using $CO_2$ solutions at lower pressures, the process is much more effective when the $CO_2$ solution is used under the higher $CO_2$ pressures taught in the present invention.

What is claimed is:

1. In a process of regenerating and exhausting weak acid and weak base ion exchange resins which comprises passage of acidic and/or basic fluids through a three bed system comprising (a) as a first bed a carboxylic acid cation exchanger in the free acid form with appurtenant degassing apparatus, (b) as a second bed, a lime softening bed, and (c) as a third bed, a weak base anion exchanger in the free base form, the improvement comprising regenerating and exhausting the three bed system by:
    1. passing a solution of carbon dioxide in water under a pressure of about 100 to about 300 psi through the first bed to regenerate the sodium form of the weak acid cation resin,
    2. degassing the resulting fluid of "1" to eliminate substantially any $CO_2$
    3. passing the sodium salt obtained in "1" to regenerate the weak base anion resin in the third bed, the effluent from the third bed comprised of sodium chloride and sodium sulfate,
    4. running the system in reverse by passing an aqueous solution comprised of calcium, magnesium, sodium, chloride, sulfate and bicarbonate ions through the weak base anion exchanger of bed three, thereby exhausting the weak base anionic exchange resin,
    5. passing the effluent of "4" to the lime softening bed wherein the calcium and magnesium cations are precipitated as calcium carbonate and magnesium hydroxide, and
    6. then passing the effluent of "5" to the weak acid cation exchange resin wherein the sodium cation is exchanged for hydrogen ions resulting in exhaustion of the weak acid cation exchange resin.

2. The process of claim 1 wherein the cation exchange resin is a methacrylic acid crosslinked copolymer.

3. The process of claim 2 wherein the carboxylic cation exchange resin is comprised of a copolymer of methacrylic acid and divinyl benzene.

4. The process of claim 1 wherein the weak base anion exchange resin is selected from the group consisting of copolymers of methyl acrylates and divinyl benzene which have been aminolyzed with a polyamine.

* * * * *